US012097801B2

(12) United States Patent
Jones et al.

(10) Patent No.: US 12,097,801 B2
(45) Date of Patent: Sep. 24, 2024

(54) ILLUMINATED COMMUNICATION UNIT FOR A VEHICLE WITHIN A TRANSPORTATION NETWORK

(71) Applicant: Lyft, Inc., San Francisco, CA (US)

(72) Inventors: Alfred Charles Jones, San Jose, CA (US); Azhar Kamal Meyer, Pacifica, CA (US); Marco Antonio Marroquin, San Francisco, CA (US); Richard Wimmer, San Francisco, CA (US); Ethan Duncan Eyler, San Francisco, CA (US); John Sungchun Chiu, Hayward, CA (US); Lakshmaiah Brahmasani, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 755 days.

(21) Appl. No.: 17/136,911

(22) Filed: Dec. 29, 2020

(65) Prior Publication Data

US 2022/0203886 A1 Jun. 30, 2022

(51) Int. Cl.
*B60Q 1/50* (2006.01)
*B60Q 1/00* (2006.01)
*B60Q 1/26* (2006.01)
*B60Q 1/28* (2006.01)
*H05B 47/11* (2020.01)
*H05B 47/19* (2020.01)

(52) U.S. Cl.
CPC .......... *B60Q 1/543* (2022.05); *B60Q 1/0023* (2013.01); *B60Q 1/268* (2013.01); *B60Q 1/28* (2013.01); *B60Q 1/503* (2013.01); *H05B 47/11* (2020.01); *H05B 47/19* (2020.01); *B60Q 2400/20* (2013.01); *B60W 2556/50* (2020.02)

(58) Field of Classification Search
CPC .... B60Q 1/263; B60Q 1/543; B60W 2556/50
See application file for complete search history.

(56) References Cited

U.S. PATENT DOCUMENTS

2001/0013825 A1* 8/2001 DeLine ..................... B60R 1/04
340/425.5
2014/0338237 A1* 11/2014 Chu ......................... G09F 9/33
40/452

(Continued)

FOREIGN PATENT DOCUMENTS

CN 207250043 U * 4/2018

*Primary Examiner* — Keith G. Delahoussaye
(74) *Attorney, Agent, or Firm* — Baker Botts L.L.P.

(57) ABSTRACT

An illuminated communication unit for a vehicle is provided. The communication unit may include an enclosure carrying components within a cavity that include a printed circuit board assembly (PCBA) and a heat sink. The PCBA may include a position sensor in communication with the vehicle and configured to detect a position of the vehicle, and a plurality of light emitting elements disposed adjacent to the position sensor and configured to generate a light output. The heat sink may be configured to dissipate heat caused by the plurality of light emitting elements generating the light output. The communication unit may include a diffuser lens that includes a lens surface having an emblem disposed thereon, the diffuser lens being configured to receive the light output generated by the plurality of light emitting elements and diffusely illuminate the emblem. The lens surface may be configured to widely disperse the light output.

18 Claims, 14 Drawing Sheets

(56) References Cited

U.S. PATENT DOCUMENTS

| | | | |
|---|---|---|---|
| 2017/0142556 A1* | 5/2017 | Matus | G10L 25/48 |
| 2018/0096445 A1* | 4/2018 | Eyler | G06Q 10/02 |
| 2020/0254877 A1* | 8/2020 | Nakajima | B60J 1/02 |
| 2020/0361370 A1* | 11/2020 | Wescott | B60Q 5/006 |
| 2021/0190516 A1* | 6/2021 | Ventimiglia | G06V 20/59 |
| 2021/0247047 A1* | 8/2021 | Balaj | F21V 29/70 |
| 2021/0300239 A1* | 9/2021 | Takori | B60Q 1/268 |
| 2021/0300240 A1* | 9/2021 | Takori | B60Q 1/5035 |

\* cited by examiner

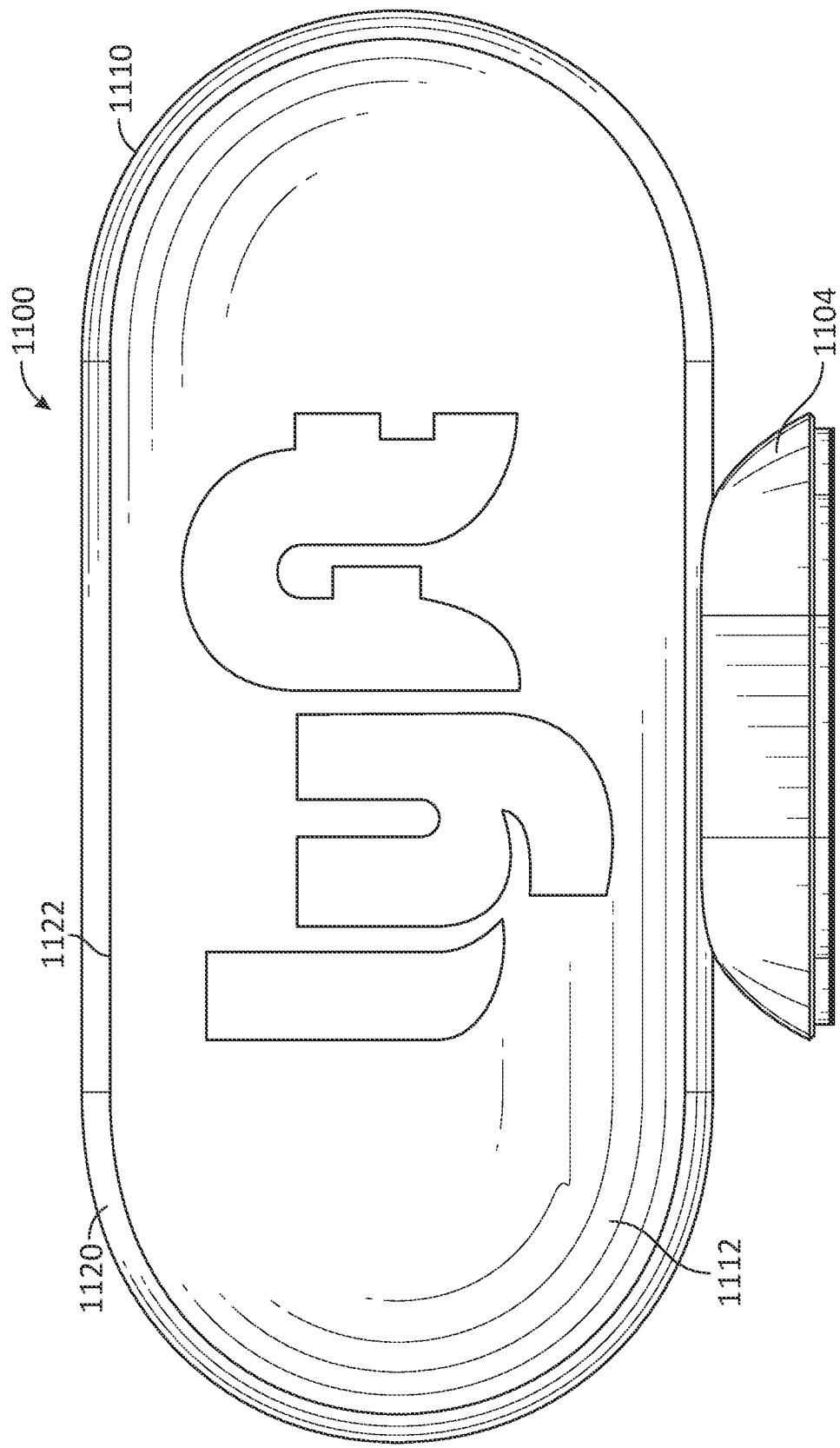

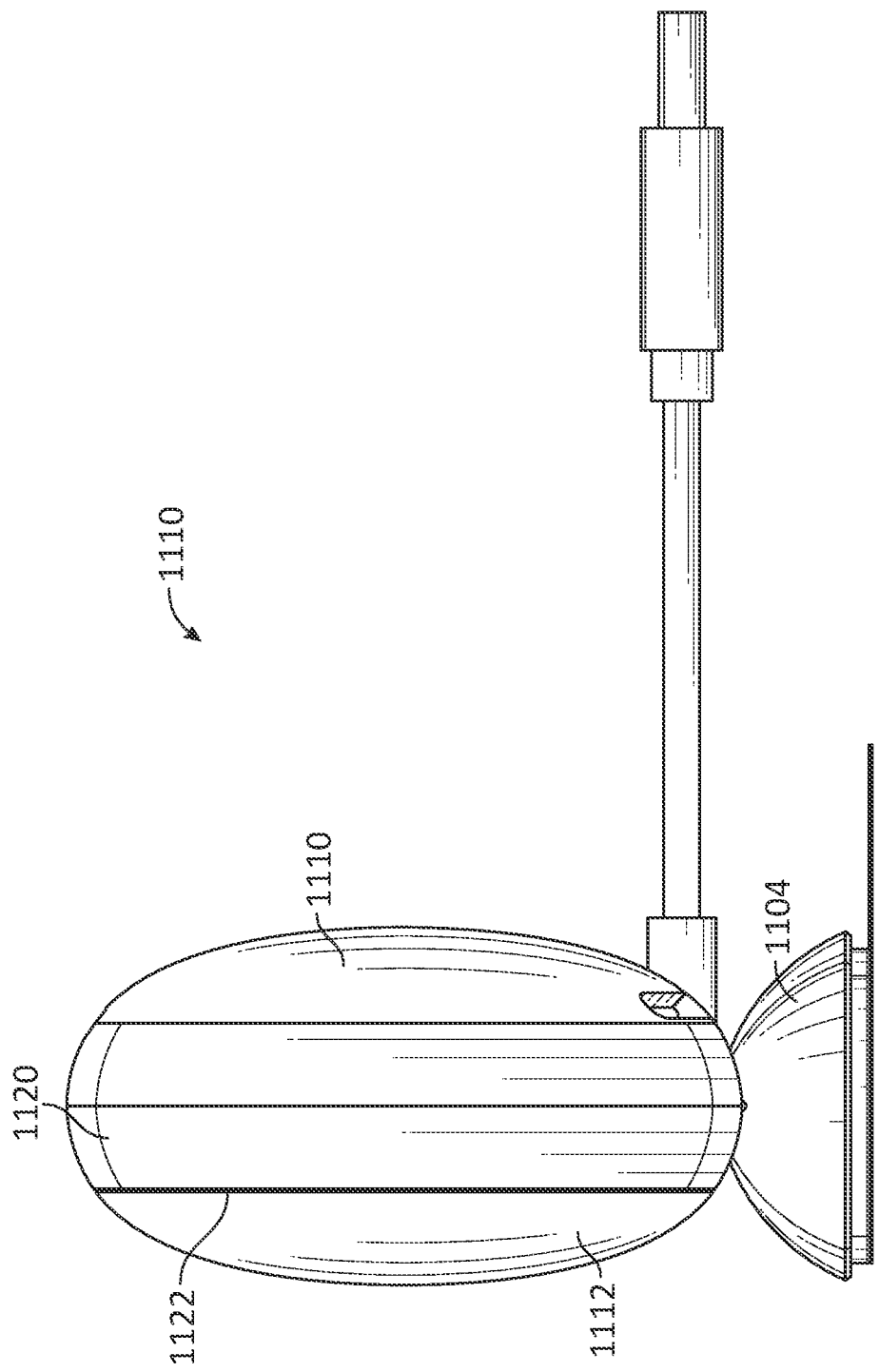

ILLUMINATED COMMUNICATION UNIT FOR A VEHICLE WITHIN A TRANSPORTATION NETWORK

TECHNICAL FIELD

One or more embodiments of the present disclosure relate generally to vehicle accessories and more particularly, for example, to an illuminated communication unit for attachment to a windshield of a vehicle.

BACKGROUND

Ridesharing platforms often include an illuminated unit used to identify a vehicle within the fleet of the ridesharing platform. Typically, the illuminated unit is installed in the front windshield area of the vehicle, such that a person requesting a ride from the ridesharing platform can identify a potential vehicle assigned to the ride request as the vehicle approaches. However, these illuminated units often do not work in all situations. For example, some conventional units may not be bright enough to see, such as during daylight hours when strong daylight can minimize light intensity from the units. Confirmation of an assigned vehicle may also require confirmation of the license plate of the vehicle, which may be difficult to see in some conditions.

Therefore, there is a need in the art for an illuminated communication unit for a vehicle that addresses the deficiencies noted above, other deficiencies known in the industry, or at least offers an alternative to current techniques. For example, improvements are needed for a communication unit that is bright, easy to install and adjust, and improves identification and location accuracy of an associated vehicle compared to conventional systems.

SUMMARY

Systems and methods are disclosed for an illuminated communication unit for a vehicle. In accordance with one or more embodiments, a communication unit for attachment to a vehicle is provided. The communication unit may include an enclosure including walls that define a cavity. The walls may carry components within the cavity that include a printed circuit board assembly (PCBA) including a plurality of light emitting elements, a position sensor configured to detect a position of the communication unit in an environment, and a thermal architecture configured to dissipate heat generated by the plurality of light emitting elements and the position sensor. The communication unit may include a lens secured to the enclosure and including an emblem configured to be illuminated by the plurality of light emitting elements. The communication unit may include a mount configured to attach the enclosure to the vehicle.

In accordance with one or more embodiments, a communication unit for use with a vehicle is provided. The communication unit may include an enclosure defining a cavity. The enclosure may carry components within the cavity that include a printed circuit board assembly (PCBA) and a heat sink coupled to the PCBA. The PCBA may include a position sensor in communication with the vehicle and configured to detect a position of the vehicle, and a plurality of light emitting elements disposed adjacent to the position sensor and configured to generate a light output. The heat sink may be configured to dissipate heat caused by the plurality of light emitting elements generating the light output. The communication unit may include a diffuser lens that includes a lens surface having an emblem disposed thereon, the diffuser lens being configured to receive the light output generated by the plurality of light emitting elements and diffusely illuminate the emblem. The lens surface may be configured to widely disperse the light output.

In accordance with one or more embodiments, a communication unit for a vehicle is provided. The communication unit may include a housing including an enclosure and a lens coupled to the enclosure. The housing may carry a printed circuit board assembly (PCBA), an environmental sensor, and a heat sink. The PCBA may include a position sensor configured to detect a position of the communication unit, and a plurality of light emitting diodes (LEDs) arranged around the position sensor and configured to generate light output for illuminating an emblem of the lens. The environmental sensor may be configured to detect an environmental condition external to the housing, wherein the light output generated by the plurality of LEDs is adjustable based on the environmental condition detected by the environmental sensor. The heat sink may be configured to dissipate heat generated by the PCBA.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the disclosure described herein and should not be construed as a complete depiction of the scope of the disclosure.

FIG. 13 illustrates a front elevation view of the communication unit of FIG. 11, in accordance with an embodiment of the disclosure.

FIG. 14 illustrates a side elevation view of the communication unit of FIG. 11, in accordance with an embodiment of the disclosure.

Embodiments of the disclosure and their advantages are best understood by referring to the detailed description that follows. It should be appreciated that like reference numerals are used to identify like elements illustrated in one or more of the figures.

DETAILED DESCRIPTION

Figure 1:
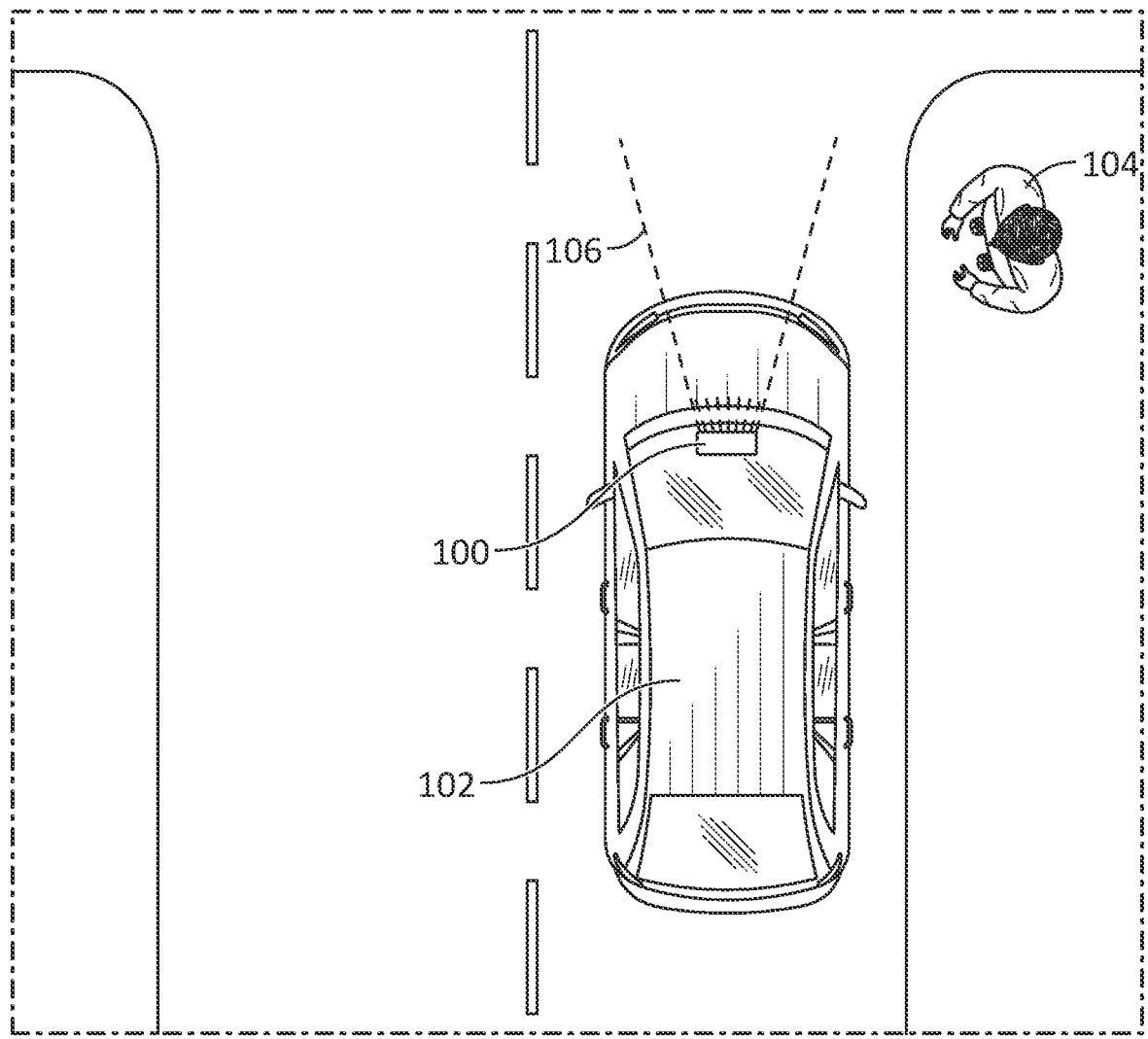
FIG. 1 illustrates a diagram of a conventional illuminated unit for a vehicle.

Transportation network companies may use an illuminated unit to identify themselves to riders. However, current units have difficulty being seen in different types of conditions. For example, bright sunlight, conditions where there is a large amount of glare (e.g., directly hitting the face of the windshield), and conditions where the unit is not directly facing the passenger or ride requestor, among other conditions, may reduce visibility of the unit. Current systems also require drivers to use their phones to help locate their positions. Such systems, however, may induce location and mapping issues due to urban canyon effects and/or weak GNSS chips of the drivers' phones, for example. Current units may also not be capable of dissipating heat, which may affect performance and lead to premature failure, such as when the units are positioned in the front windshield area of a vehicle under full solar load.

According to the present disclosure, an illuminated communication unit for a vehicle is provided. The communication unit may include a lighting scheme including a lens and a plurality of front-facing LEDs that are bright and thermally efficient. In some embodiments, RGBW (red, green, blue, and white) LEDs may be utilized that provide increased intensity and color compared to conventional LEDs. The lens, which may be a Fresnel lens, may create or define a lighting characteristic, such as a wide beam spectrum of light. The lens may also diffuse (e.g., seamlessly) the light generated by the LEDs. The lens may be configured to concentrate the light into a desired beam. The LEDs may be arranged primarily around a perimeter of a main printed circuit board assembly (PCBA), such as to make room for other sensors and/or help create a wide dispersal of the light (e.g., 180-degree or near 180-degree visible light spectrum). An ambient light sensor may be used to control a lumen output of the LEDs, if needed, such as for safety or due to regulatory requirements. For example, the LEDs may be dimmed at night, while driving to reduce windshield glare, or to comply with local regulations. An ambient temperature sensor may be used to adjust operation of the LEDs (e.g., a light output) based on ambient temperature. For example, the LEDs may be dimmed under high ambient temperatures to help prevent potential heat failure of the communication unit. The color of the LEDs may also be adjusted to facilitate identification of an assigned vehicle by a ridesharing passenger or requestor upon approach. For example, a rideshare requestor may set (or be notified of) a particular color or color scheme of the communication unit associated with a vehicle assigned to the rideshare requestor. Thus, identification of the particular color or color scheme may confirm the ride dispatched or sent to the rideshare requestor.

The communication unit may include a thermal architecture that efficiently dissipates heat generated by the LEDs or other components of the communication unit (e.g., sensors, PCBA, etc.). The thermal architecture may include a heat sink with a unique structure (e.g., fin geometry) that "guides" airflow to one or more vents disposed in the communication unit's housing (e.g., from the center of the heat sink to the sides of the heat sink near the vents). One or more thermal interface pads may be placed between the PCBA and the heat sink to provide a pathway for heat to dissipate from the PCBA (e.g., LEDs) to the heat sink. The heat sink may include a cutout to facilitate communications to or from one or more communication modules on the PCBA (e.g., Bluetooth, etc.). The thermal architecture may allow the communication unit to operate at full brightness under extreme conditions (e.g., under full solar load in the middle of summer for extended periods) without failure. For example, the thermal architecture may ensure the communication unit can provide full functionality (e.g., brightness, position detection, communication via Bluetooth, etc.) under all conditions and/or prevent or limit thermal stress caused by high temperature loads.

The communication unit may include one or more position sensors. For example, the communication unit may include a GNSS sensor/receiver that is used to determine the location of the communication unit without use of an external device (e.g., a driver's smartphone or the vehicle itself). The GNSS sensor/receiver may be placed at the center of the PCBA, surrounded by the LEDs. The communication unit may include an IMU that can be used for increased location accuracy, such as in urban environments with urban canyons that hinder GNSS operation.

The communication unit may be mounted to a windshield of a vehicle (e.g., to a front windshield) in many configurations. As one example, a mount may include a windshield mount that is secured to the windshield via adhesive, the windshield mount including a plurality of magnets and a cylindrical boss extending from a base. The housing (e.g., a rear enclosure) of the communication unit may include a device mount having a hole disposed therein and a steel plate. The boss of the windshield mount may be positioned within the hole of the device mount, with the magnets magnetically coupled to the steel plate to secure the communication unit in place. The communication unit may be rotated to adjust a horizontal level of the communication unit. For example, the boss may rotate within the hole to adjust the communication unit to level. The interface between the windshield mount and the device mount may frictionally hold the relative positions of the mounts. In this manner, the interface between the windshield mount and the device mount may function as a friction hinge.

The communication unit may include additional features as desired. For example, one or more gaskets may be positioned at the periphery of the PCBA, such as at an interface between the PCBA and the lens, to reduce light bleed from the communication unit's housing. A power cable may interface with the communication unit's housing to limit or prevent loads at the connection. For example, the power cable may interface with the housing to transfer loads to the housing and not to the connection.

FIG. 1 illustrates a diagram of a conventional illuminated unit 100 for a vehicle 102. The illuminated unit 100 may be associated with a transportation network company, such as a ridesharing platform. Transportation network companies may use the illuminated unit 100 to identify themselves to riders, such as rider 104. For example, a driver for the transportation network company may place the illuminated unit 100 on the dashboard of vehicle 102, so that rider 104 may identify the company and a potential ride upon approach.

Conventional illuminated units (e.g., illuminated unit 100) may have several limitations. For example, illuminated unit 100 may not be able to dissipate heat, such as from operation of the illuminated unit 100 or from placement of the illuminated unit 100 on the dashboard under full solar load, leading to failure of the unit 100 from excessive heat (i.e., heat failure). Conventional units may also be difficult to install and may require permanent or semi-permanent installation, requiring the unit to be left on the dashboard for permanently or for extended periods.

Illuminated unit 100 may also have difficulty being seen in different types of conditions (e.g., bright sunlight, at certain angles to rider 104, etc.). For example, rider 104 may not be able to view illuminated unit 100 at certain angles (e.g., at a pickup point). Illuminated unit 100 may also be difficult to see by rider 104 when there is a large amount of glare (e.g., directly hitting the face of the windshield) or when illuminated unit 100 is not directly facing rider 104. Often, illuminated unit 100 may emit a narrow beam or narrow-angle spectrum of light 106 or have a low-intensity light output. Without the illuminated unit 100 directly or near directly facing rider 104, and with the low-intensity light output of unit 100, the rider 104 may not be able to see or identify illuminated unit 100, which may lead to lost rides or ride opportunities.

Conventional systems (e.g., illuminated unit 100) may also have difficulties providing an accurate location and estimated time of arrival (ETA) of a ride (e.g., vehicle 102) assigned to a ride request (e.g., assigned to rider 102). For example, the location and/or ETA of the assigned vehicle may be inaccurate, which may lead to frustration of the ride requestor and cancellation of requested rides. Conventional systems may utilize location information from a driver's smartphone or other device. Differences in phones, cellular carriers and coverages may lead to location inconsistencies across drivers, as well as location inaccuracies (e.g., due to urban canyon effects, lack of powerful GNSS chips, etc.). These and other conditions induce location and mapping issues.

Figure 2A:
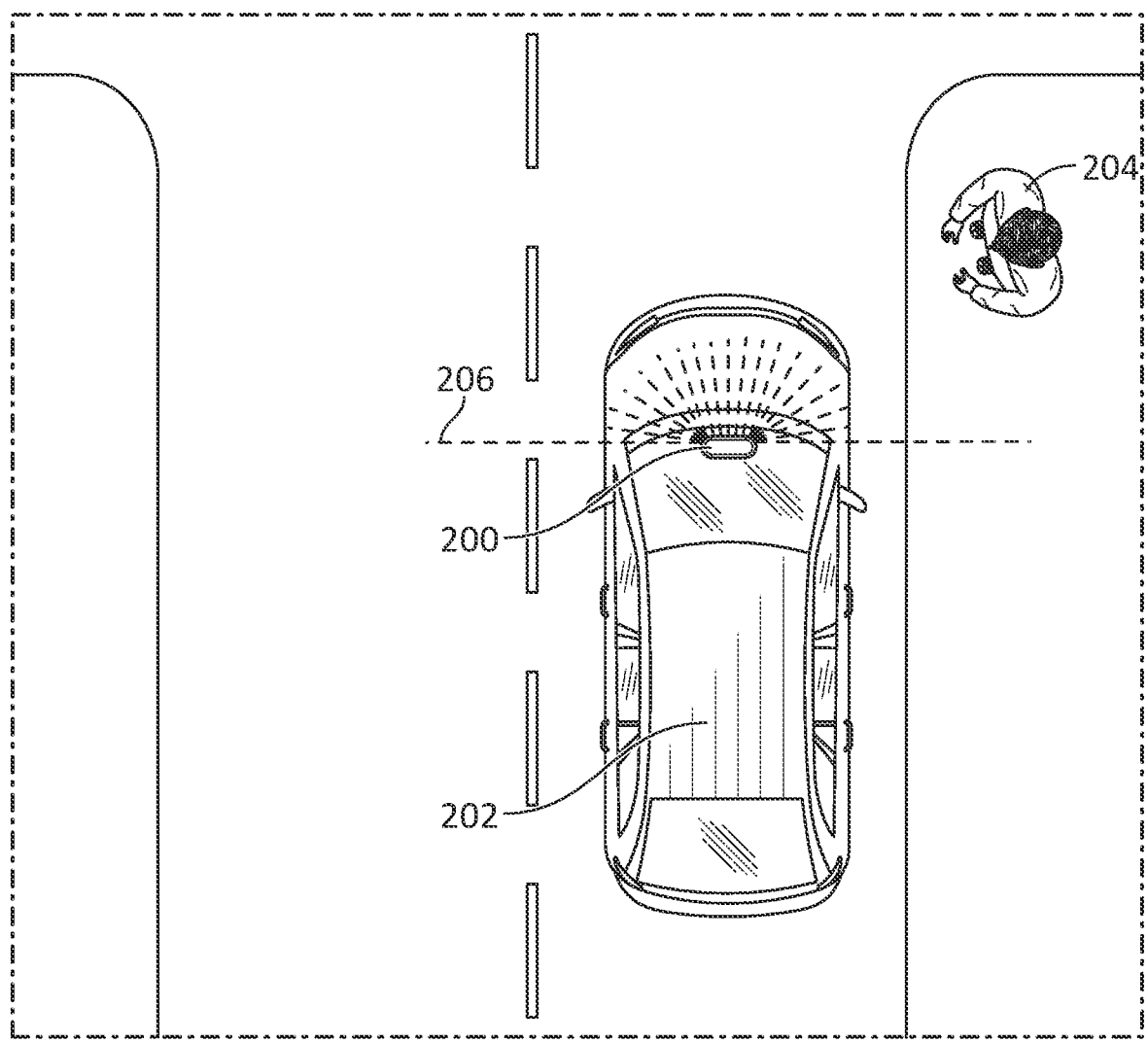
FIG. 2A illustrates a diagram of an illuminated communication unit for a vehicle, in accordance with an embodiment of the disclosure.

FIG. 2A illustrates a diagram of an illuminated communication unit 200 for a vehicle 202, in accordance with an embodiment of the disclosure. The communication unit 200 may be configured to address one or all deficiencies of illuminated unit 100 noted above. For example, communication unit 200 may emit a wide beam or wide-angle spectrum of light 206 that is readily identifiable by rider 204. For instance, communication unit 200 may emit a 180-degree or near 180-degree field-of-view of light, so that light from communication unit 200 is visible from greater positions and angles compared to illuminated unit 100. The light emitted from communication unit 200 may also be brighter compared to illuminated unit 100, such that communication unit 200 can be seen under bright sunlight, under high glare, or other conditions.

As described more fully below, communication unit 200 may include a powerful GNSS chip or other position sensor to improve location and mapping issues. Thus, the communication unit 200 itself may be used to locate the position of vehicle 202. The communication unit 200 may be mounted to or above the dashboard (e.g., to the windshield) to facilitate satellite matchup and improve authentication issues, among others.

To account for a more powerful lighting system and positional sensing, the communication unit 200 may be equipped with advanced thermal dissipation capability. In addition, mounting the communication unit 200 within the front windshield area or dashboard of vehicle 202 results in communication unit 200 being exposed to large sun exposure and radiation, which can increase operating temperature, affect performance, and lead to premature failure without increased thermal dissipation capability. Thus, communication unit 200 may include a thermal architecture configured to ensure communication unit 200 provides all functions (e.g., brightness, position detection, communication (e.g., Bluetooth), etc.) under all conditions, as detailed below.

Figure 2B:
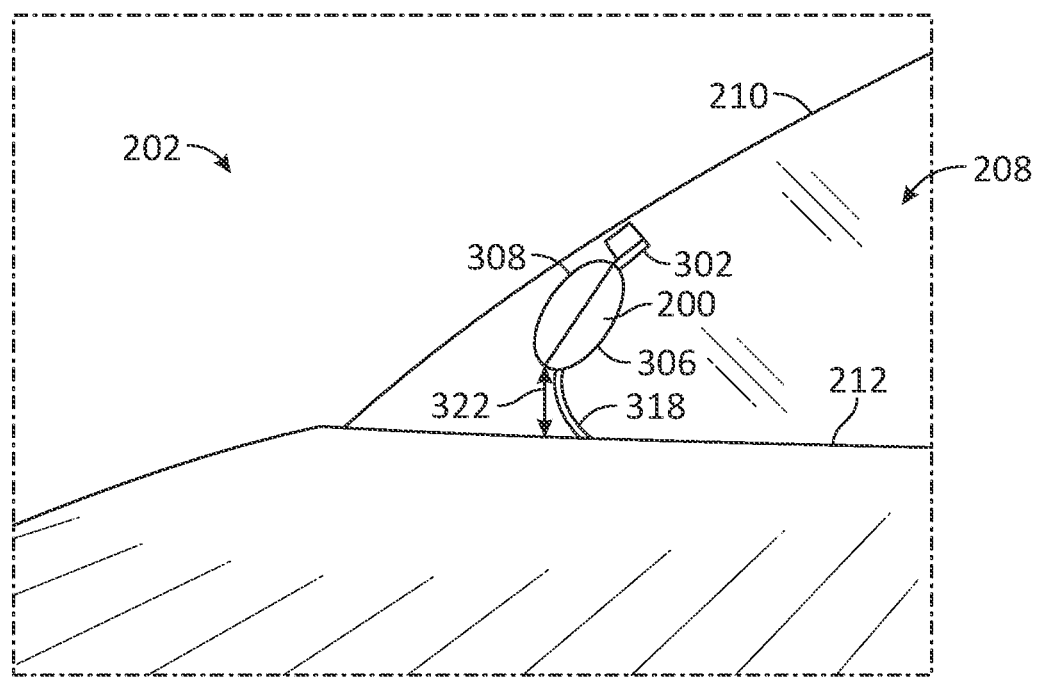
FIG. 2B illustrates a diagram of an attachment of the communication unit to a windshield of the vehicle, in accordance with an embodiment of the disclosure.

FIG. 2B illustrates a diagram of an attachment of the communication unit 200 to a windshield of vehicle 202, in accordance with an embodiment of the disclosure. As shown, vehicle 202 includes a vehicle cabin defining a vehicle interior 208. As best illustrated in FIG. 2B, the vehicle 202 includes a front windshield 210 and a dashboard 212. The communication unit 200 may be positioned within the vehicle interior 208, such that the communication unit 200 is visible from the exterior of the vehicle 202. For example, the communication unit 200 may be positioned for visibility within the space between the front windshield 210 and the dashboard 212. As shown, the communication unit 200 may be attached to the front windshield 210 above the dashboard 212, such as low on the front windshield 210 near the dashboard 212.

The communication unit 200 may be configured to facilitate identification of the communication unit 200 by a passenger. For instance, the communication unit 200 may illuminate, such as forwardly toward the front of the vehicle 202. Depending on the application, the illumination of the communication unit 200 may allow passenger identification of the communication unit 200 in daylight or low-light conditions. For example, the communication unit 200 may be bright enough to see during daylight hours and from a distance. Similarly, illumination of the communication unit 200 during low-light conditions (e.g., at night, at dusk, during cloudy or other weather events, etc.) may allow the communication unit 200 to be easily identifiable and seen from a distance. Exemplary distances include between about 30 feet and about 50 feet or greater than 50 feet. Exemplary angle spectrums of communication unit 200 include greater than 90 degrees, greater than 135 degrees, and up to 180 degrees.

The communication unit 200 may be associated with a ridesharing service. In embodiments, the communication unit 200 may distinguish a ridesharing provider to a passenger, such that the passenger may identify a particular vehicle 202 or vehicles 202. For example, a ride may be requested by a rideshare requestor from a ridesharing provider. A vehicle for carrying the rideshare requestor on the ride may be dispatched or sent to the rideshare requestor. Identification of the communication unit 200 by the rideshare requestor may allow the rideshare requestor to identify the vehicle dispatched or sent to the rideshare requestor as the vehicle is approaching. To facilitate identification of the communication unit 200, the communication unit 200 may include one or more logos, an identifiable color scheme or illumination, an identifiable shape, or the like.

Figure 3:
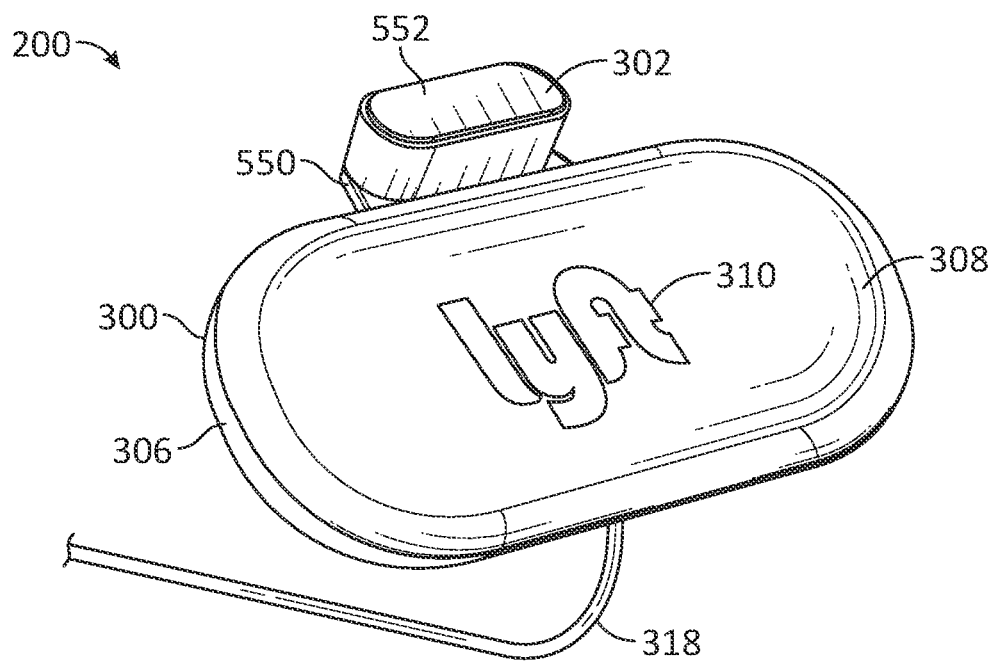
FIG. 3 illustrates a front perspective view of the communication unit, in accordance with an embodiment of the disclosure.
Figure 4:
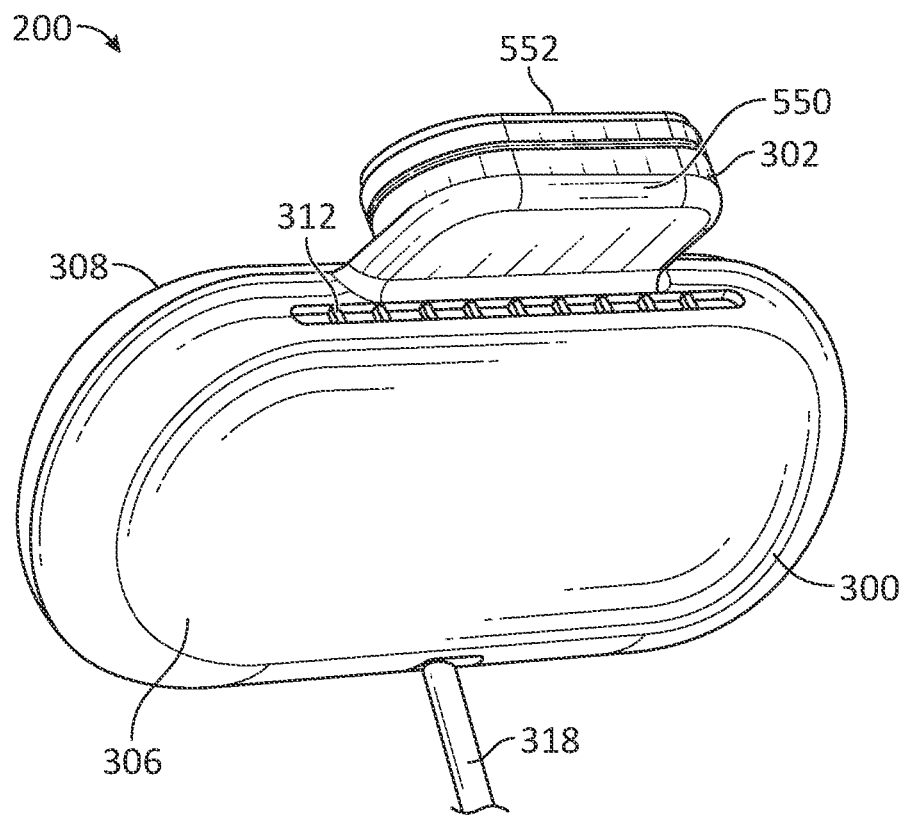
FIG. 4 illustrates a rear perspective view of the communication unit, in accordance with an embodiment of the disclosure.

FIG. 3 illustrates a front perspective view of the communication unit 200, in accordance with an embodiment of the disclosure. FIG. 4 illustrates a rear perspective view of the communication unit 200, in accordance with an embodiment of the disclosure. Referring to FIGS. 3-4, the communication unit 200 may include a housing 300 and a mount 302 configured to releasably secure the communication unit 200 to the vehicle 202. The housing 300 may include an enclosure (e.g., a rear enclosure 306) and a lens 308 coupled to the rear enclosure 306. As shown, the lens 308 (e.g., which may be referred as a diffuser lens) may include a lens surface having an emblem 310 (e.g., a logo or other indicia) disposed thereon. The lens surface may be curved, although other configurations are contemplated. The curved lens surface may facilitate in diffusing light emitted from one or more light emitting elements of the communication unit 200.

The lens 308 may be configured to diffuse light emitted from one or more light emitting elements of the communication unit 200. For example, the lens 308 may be configured to receive the light output generated by the light emitting elements and diffusely illuminate the emblem 310. In embodiments, the lens 308 may be designed to scatter light in a desired manner, such as seamlessly or non-seamlessly, uniformly or nonuniformly, etc. across the lens 308. The lens 308 (e.g., the lens surface) may widely disperse the light output of the light emitting elements, such as creating a wide beam or wide-angle spectrum of light, as described above. For instance, the lens surface may be configured to cause the light output to be uniformly distributed at the lens 308. The emblem 310 may be illuminated, which may aid identification of the communication unit 200 by an observer, a ridesharing passenger, or others. As shown, the emblem 310 may be positioned centrally on the lens 308, although other configurations are contemplated.

In embodiments, the lens 308 may be a Fresnel lens capable of focusing light into a desired beam and at a desired beam angle. For example, lens 308 may include multiple contours (e.g., concentric grooves, sections, or other contours) that act as individual refracting surfaces. This structure may allow lens 308 to capture and focus oblique light from a light source, thereby allowing the light from communication unit 200 to be visible over greater distances compared to conventional lenses. For example, lens 308 may collimate light from one or more light sources into parallel rays, thereby minimizing the spread of light as it propagates from communication unit 200. Although a Fresnel lens is described, other types of lenses may be implemented, such as plano-convex, biconvex, or other type of lens.

As shown, the lens 308 is positioned at the front of the communication unit 200 to diffuse light forward or generally forward of the communication unit 200, such as towards the front of the vehicle 202 when the communication unit 200 is connected to the front windshield 210. As shown in FIG. 4, the rear enclosure 306 may include a vent 312, such as one vent 312 or multiple vents 312, to help dissipate heat generated by the communication unit 200 from the housing 300.

Referring to FIGS. 2B-4, the mount 302 may be a windshield mount configured to secure the rear enclosure 306 to a windshield (e.g., the front windshield 210) of the vehicle 202. Thus, communication unit 200 may be lightweight and have a small form factor so that it can be mounted onto the front windshield 210. The mount 302 may be connected to or defined at least partially by the rear enclosure 306. For example, the mount 302 may extend from or be coupled to the rear enclosure 306. In embodiments, the mount 302 may be cantilevered from the rear enclosure 306. As best illustrated in FIG. 2B, the mount 302 may extend at an angle from the rear enclosure 306 to accommodate positioning of the communication unit 200 low on the front windshield 210 near the dashboard 212. For instance, the mount 302 may be angled away from the lens 308 to position the lens 308 away from the front windshield 210 and towards the dashboard 212 when the communication unit 200 is connected to the front windshield 210. As a result, the mount 302 may be shaped or otherwise configured to space the lens 308 away from the front windshield 210 for clearance.

As shown in FIGS. 2B-4, the communication unit 200 may include a power cable 318. The power cable 318 may extend from the rear enclosure 306 for connection to a power source (e.g., a 12-volt power supply of the vehicle 202). As shown in FIG. 2B, the communication unit 200 may be connected to the front windshield 210 to create a clearance 322 between the communication unit 200 and the dashboard 212 sufficient for routing the power cable 318 from the communication unit 200 to the power source. For example, the clearance 322 may be sufficient to limit or prevent kinking/folding of or damage to the power cable 318 extending from the communication unit 200. Depending on the application, the clearance 322 may be about 1 inch, greater than 1 inch, or less than 1 inch.

Figure 5A:
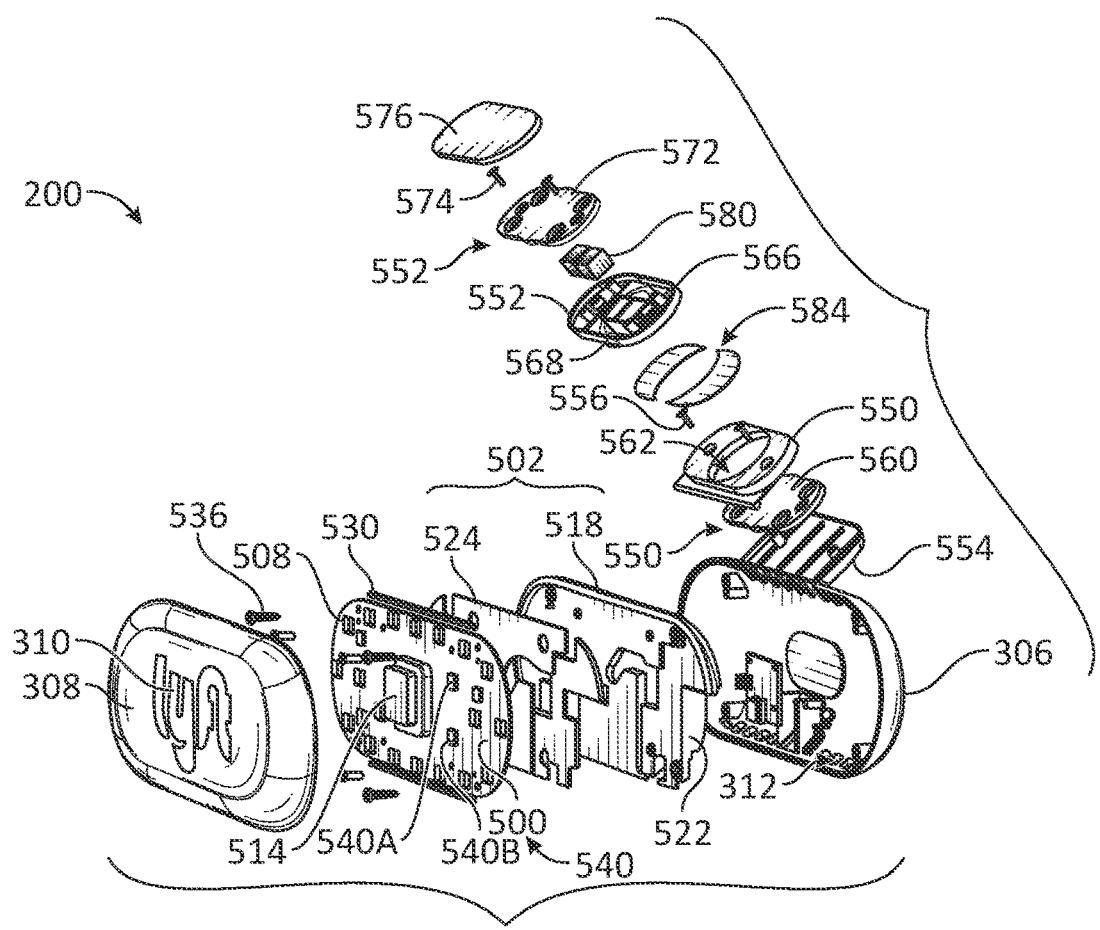
FIG. 5A illustrates an exploded view of the communication unit, in accordance with an embodiment of the disclosure.

FIG. 5A illustrates an exploded view of the communication unit 200, in accordance with an embodiment of the disclosure. The communication unit 200 may include a printed circuit board assembly (PCBA) 500 and a thermal architecture 502 configured to dissipate heat generated by the PCBA 500. The PCBA 500 may be positioned within the housing 300. As shown, the PCBA 500 is a planar board that includes one or more electronic components electrically connected using conductive traces, pads, and other features. The PCBA 500 includes a plurality of light emitting elements. In embodiments, the plurality of light emitting elements may include a plurality of light emitting diodes (LEDs) 508, although other light emitting components are contemplated. As a result, any discussion associated with the LEDs 508 may be applied to other light emitting devices, where appropriate. The lens 308 may be configured to diffuse, collimate, or focus the light emitted from the LEDs 508. The LEDs 508 may be thermally efficient, such as generating a low amount of heat during operation. Depending on the application, each LED may include an RGBW (red, green, blue, white) configuration, although other configurations are contemplated (e.g., RGB LEDs). RGBW LEDs may provide increased light intensity, color, and power efficiency compared to other LED configurations. For example, an RGBW LED configuration may produce higher intensity light and better color rendering while consuming less power compared to other LED configurations. As shown, the LEDs 508 may be front-facing, such as facing away from the rear enclosure 306 and/or towards the lens 308.

The PCBA 500 (or a controller associated with the PCBA 500) may control output of the LEDs 508. For example, the PCBA 500 may control the luminosity, brightness, and/or color of each LED to achieve a light emitting characteristic. For example, the PCBA 500 may control the brightness of the LEDs 508 based on conditions, such as increasing the brightness of the LEDs 508 in brighter ambient conditions and decreasing the brightness of the LEDs 508 in dimmer ambient conditions, as described below. In embodiments, the color or color pattern of the LEDs 508 may be adjusted or changed by the PCBA 500. The color or color pattern of the LEDs 508 may be set to facilitate identification of the communication unit 200 by a rideshare requestor upon approach of the vehicle 202. For example, the rideshare requestor may be notified of (or set) a particular color or color scheme of the communication unit 200, where the particular color or color scheme may be set or determined by the rideshare system or by the rideshare requestor (such as through a default setting of the rideshare requestor or set at the time of requesting the ride). Identification of the particular color or color scheme by the rideshare requestor may confirm the ride dispatched or sent to the rideshare requestor. As a result, the lighting color of the LEDs 508 may be changed to facilitate identification of the vehicle 202 assigned to a rideshare requestor without needing to confirm the license plate of the assigned vehicle 202, for example, which makes it easier for the rideshare requestor to identify the assigned vehicle 202, especially in situations where the rideshare vehicle does not have a front license plate.

In some embodiments, the PCBA 500 may include a position sensor 514 configured to detect a position of the communication unit 200. The position sensor 514 may include at least one of a global navigation satellite system (GNSS) sensor/receiver or an inertial measurement unit (IMU). The position sensor 514 (e.g., GNSS sensor/receiver) may be implemented according to any global navigation satellite system, including a GPS, GLONASS, and/or Galileo based receiver and/or other device, capable of determining absolute and/or relative position of the communication unit 200, or an element of the communication unit 200, based on wireless signals received from space-born and/or terrestrial sources (e.g., eLoran and/or other at least partially terrestrial systems). In embodiments, the position sensor 514 (e.g., IMU) may be implemented to detect a change in relative position of communication unit 200 based on one or more changes in accelerometer data. In some embodiments, the position sensor 514 may implement both an absolute positioning device (e.g., GNSS receiver) and a relative positioning device (e.g., IMU) for increased location accuracy. The relative positioning device (e.g., IMU) may determine the position of communication unit 200 when the absolute positioning device (e.g., GNSS receiver) is not working or fails to receive a signal (e.g., within an environment blocking communications with satellite or cellular systems, in urban environments with urban canyons that hinder GNSS operation, etc.). The IMU may monitor acceleration data of communication unit 200, such as to detect a potential accident of vehicle 202. In some embodiments, position sensor 514 may include an altimeter, for example, or may be used to provide an absolute altitude.

The position sensor 514 may be configured to provide position measurements as sensor signals and/or data (e.g., coordinates) that may be communicated to various components or systems of communication unit 200 or to an external system (e.g., a ridesharing network). As a result, both the position of the communication unit 200 as well as an estimated time of arrival (ETA) of the vehicle 202 carrying the communication unit 200 may be determined, which may improve information provided to the rideshare requestor as to location and ETA of the ridesharing vehicle 202 compared to conventional systems. For example, some conventional systems rely on position information provided by a smartphone, for instance, of the driver of vehicle 202 to track location and ETA of vehicle 202. Embodiments of the present disclosure may allow location and ETA information to be generated without use of a smartphone or other external device. In addition, location and ETA information may be accurate, or more accurate than conventional systems, even in areas where cellular service is intermittent or nonexistent.

As shown, the LEDs 508 may be arranged around the position sensor 514. For example, the position sensor 514 may be positioned centrally or generally centrally on the PCBA 500, with the LEDs 508 arranged along a perimeter or periphery of the PCBA 500 and around the position sensor 514. The LEDs 508 may be positioned around the PCBA 500 to create a wide dispersal of light, such as to induce a 180-degree or near 180-degree visible light spectrum (see FIG. 2A). In embodiments, the arrangement of the LEDs 508 may help to increase brightness of communication unit 200. The position of the LEDs 508 around the perimeter of the PCBA 500 may also facilitate light uniformity in a wide angle. The LEDs 508 may be arranged in a pattern, such as symmetrically or asymmetrically, along the PCBA 500. The pattern of LEDs may be optimized to facilitate light uniformity as well as to induce a 180-degree or near 180-degree visible light spectrum. The PCBA 500 may include any number of LEDs 508, including less than twenty LEDs 508 or twenty or more LEDs 508 (e.g., twenty LEDs, twenty-two LEDs, etc.). In one embodiment, twenty-two LEDs 508 are used. In embodiments, the number of LEDs 508 may be balanced against the heat generated by the LEDs 508 and the capability of the thermal architecture 502, such that the communication unit 200 may operate continuously without generating excessive heat.

The thermal architecture 502 may be positioned within the housing 300 to dissipate heat generated during operation of communication unit 200 (e.g., heat generated by the position sensor 514, PCBA 500, and the plurality of LEDs 508). Due to the small form factor of communication unit 200, for example, relatively high amounts of heat may be generated by the various components housed tightly within the housing 300. The thermal architecture 502 may allow the communication unit 200 to operate continuously under all conditions. For example, thermal architecture 502 may limit thermal stress caused by high temperature loads, such as caused by positioning communication unit 200 within the front windshield area of a vehicle to facilitate satellite connection under a maximum solar load (e.g., at noonday in the most extreme environments). In this way, thermal architecture 502 may ensure communication unit 200 provides full functionality (e.g., brightness, position detection, communication, etc.) under all conditions.

The thermal architecture 502 may be configured to effectively dissipate heat generated during operation of communication unit 200 under all conditions. For example, thermal architecture 502 may overcome the heat generated by the lighting performance of the LEDs 508, the operation of position sensor 514, and the positioning of the communication unit 200 in a solar loaded windshield area of a vehicle. The thermal architecture 502 may include a heat sink 518. The heat sink 518 may be coupled to the PCBA 500 to passively dissipate heat from the PCBA 500 (or components of the PCBA 500, such as position sensor 514, LEDs 508, etc.). The heat sink 518 may include fins 522 (see FIG. 6) transferring the heat generated by the PCBA 500 to the air, where the heat is dissipated away from communication unit 200. The fins 522 may be configured to facilitate air movement. For example, the fins 522 may be sized, shaped, or include a geometry configured to guide airflow to the vent 312 disposed in the rear enclosure 306, such as from a center of the heat sink 518 to the sides of the heat sink 518 near the vent(s) 312.

In embodiments, the thermal architecture 502 may include one or more thermal interface pads 524 positioned between the PCBA 500 and the heat sink 518. The thermal interface pads 524 may provide a pathway for heat to dissipate from the PCBA 500 to the heat sink 518. The thermal interface pads 524 may define a thermally conductive layer of material between the PCBA 500 and the heat sink 518. For example, heat generated in the PCBA 500 (e.g., by the LEDs 508 and/or position sensor 514, among other components) may be pulled from the PCBA 500, across the thermal interface pads 524, and into the heat sink 518. In embodiments, the thermal interface pads 524 may electrically insulate the PCBA 500 from the heat sink 518. As a result, any electrical charge in the PCBA 500 may be isolated from the heat sink 518 via the thermal interface pads 524.

With continued reference to FIG. 5A, the communication unit 200 may include other features as desired. For example, the communication unit 200 may include a gasket 530 positioned at an interface of the lens 308 with the rear enclosure 306 or the PCBA 500. The gasket 530 may be configured to limit light bleed at the interface. In this way, all or a substantial portion of the light generated by the LEDs 508 will project through the lens 308 only. As shown, one or more fasteners may secure the components within the housing 300. For example, a fastener 536 (e.g., a plurality of fasteners 536) may secure the PCBA 500 and heat sink 518 to the rear enclosure 306.

In some embodiments, communication unit 200 may include one or more ambient sensors 540. Depending on the application, the one or more ambient sensors 540 may include at least one of an ambient light sensor 540A or an ambient temperature sensor 540B. A lumen output of the LEDs 508 may be adjusted based on a condition detected by the one or more ambient sensors 540. For example, the lumen output of the LEDs 508 may be increased based on increased ambient light detected by ambient light sensor 540A, such as to increase visibility of the communication unit 200 during daylight hours. Similarly, the lumen output of the LEDs 508 may be decreased based on decreased ambient light detected by the ambient light sensor 540A, such as to match the lumen output of communication unit 200 for low-light conditions. In embodiments, the lumen output of the LEDs 508 may be decreased when a glare from communication unit 200 off the front windshield 210 is detected by the ambient light sensor 540A. In this way, lumen output of the LEDs 508 may be adjusted to match ambient light conditions.

Additionally, or alternatively, the lumen output of the LEDs 508 may be adjusted based on a detected ambient temperature. For example, the lumen output of the LEDs 508 may be decreased based on a detected increase in ambient temperature at or above a certain threshold to proactively prevent or limit chances of heat failure due to continued operation at high temperatures. When ambient temperatures drop, such as below a second threshold, as detected by the ambient temperature sensor 540B, the lumen output of the LEDs 508 may be increased. As a result, lumen output of the LEDs 508 may be matched to ambient temperatures.

With continued reference to FIG. 5A, the mount 302 may include one or more components to secure the communication unit 200 to the front windshield 210. As one example, the mount 302 may include a device mount 550 and a windshield mount 552. The device mount 550 may be connected to the rear enclosure 306, such as to a tab 554 extending from the rear enclosure 306 by one or more fasteners 556. As shown, a first metal plate 560 (e.g., steel plate) may be secured to the rear enclosure 306 between the device mount 550 and the tab 554. A recess or hole 562 may be disposed in the device mount 550 to receive at least a portion of the windshield mount 552. The hole 562 may be circular in shape, although other configurations are contemplated.

The windshield mount 552 may include a base 566 and a boss 568 extending from the base 566. The boss 568 may be sized and shaped to fit at least partially within the hole 562 of the device mount 550. The boss 568 may have a cross-section complementary to the shape of the hole 562. For example, the boss 568 may have a circular cross-section complementary to the circular shape of the hole 562. As shown, a second metal plate 572 (e.g. steel plate) may be secured to the base 566 of the windshield mount 552 via one or more fasteners 574 and an adhesive 576 (e.g., a pressure sensitive adhesive) may be applied to the second metal plate 572. The adhesive 576 may be used to attach the windshield mount 552 to the front windshield 210. One or more magnets 580 may be positioned between the second metal plate 572 and the windshield mount 552. In some embodiments, the magnets 580 may be housed within the boss 568 extending from the base 566. The magnets 580 may be configured to magnetically couple the windshield mount 552 to the device mount 550. For example, the magnets 580 may be magnetically attracted to the first metal plate 560 to couple the windshield mount 552 to the device mount 550.

The mount 302 may be adjustable to adjust a position of the communication unit 200. For example, the mount 302 may include a first member movable relative to a second member to adjust the communication unit 200 relative to the front windshield 210. In embodiments, the mount 302 may include a friction hinge 584 configured to hold the communication unit 200 in position. The friction hinge 584 may include the first member held magnetically to the second member. The first member may be rotatable within a portion of the second member to adjust the position of the communication unit 200. The first member may be the windshield mount 552, and the second member may be the device mount 550, described above. In such embodiments, the interface between the windshield mount 552 and the device mount 550 may frictionally hold the relative positions of the mounts. In this manner, the interface between the windshield mount 552 and the device mount 550 may function as the friction hinge 584.

The boss 568 of the windshield mount 552 may rotate within the hole 562 of the device mount 550 to adjust the position of the communication unit 200. For example, the device mount 550 may rotate around the boss 568, such as about an axis defined by the boss 568, to adjust the position or orientation of the communication unit 200 within the front windshield 210. In embodiments, the communication unit 200 may be rotated to adjust a horizontal level of the communication unit 200. For instance, the boss 568 may rotate within the hole 562 to adjust the communication unit 200 to level. Once positioned as desired, the magnetic connection between the device mount 550 and the windshield mount 552 may frictionally hold the position of the communication unit 200. Such embodiments are exemplary only, and the mount 302 may include other configurations allowing the communication unit 200 to be adjusted.

In embodiments, mount 302 may be used as a mechanism to allow a driver to "badge in" or "badge out." For example, connection of device mount 550 to windshield mount 552 may badge in the driver, with disconnection of device mount 550 from windshield mount 552 badging out the driver. When the driver badges in, information may be sent to the ridesharing platform regarding where the driver/vehicle is located, that the driver is ready to accept rides, and/or other information (e.g., time of badging in, status of communication unit 200, status of vehicle, etc.). When the driver badges out, information may be sent to the ridesharing platform that the driver is no longer accepting rides and/or other information (e.g., time of badging out, status of communication unit 200, location of driver/vehicle, number of rides completed, total miles driven, etc.).

Badging in or badging out may be triggered by the mechanical interface between the device mount 550 and the windshield mount 552. For example, a sensor may detect a connection state between the device mount 550 and the windshield mount 552. The sensor may be a contact sensor or other type of sensor configured to detect when the communication unit 200 is mounted to the front windshield 210. In some embodiments, connection of the communication unit 200 to the front windshield 210 (e.g., via connection of device mount 550 to windshield mount 552) may trigger a drive session of driver. As a result, the driver may no longer need to badge in or badge out using a smartphone (e.g., via an application running on the smartphone).

Figure 5B:
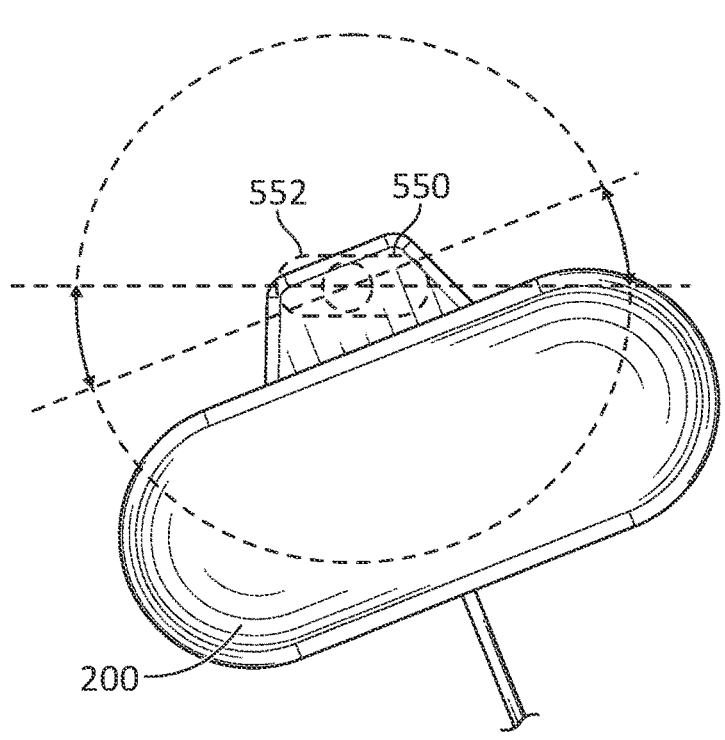
FIGS. 5B, 5C, 5D, and 5E illustrate other mounting mechanisms configured to mount the communication unit to a front windshield, in accordance with one or more embodiments of the disclosure.

Although FIG. 5A illustrates one attachment of communication unit 200 to front windshield 210, other mounting mechanisms are contemplated. For example, FIGS. 5B, 5C, 5D, and 5E illustrate other mounting mechanisms configured to mount the communication unit 200, in accordance with one or more embodiments of the disclosure. Referring to FIG. 5B, communication unit 200 may be mounted/unmounted by twisting the communication unit 200. For example, device mount 550 may be secured to windshield mount 552 by positioning device mount 550 to windshield mount 552 and twisting the communication unit 200 in a first direction (e.g., clockwise in FIG. 5A). Twisting the communication unit 200 in a second direction (e.g., counterclockwise in FIG. 5A) will unmount the communication unit 200 from windshield mount 552.

Figure 5C:
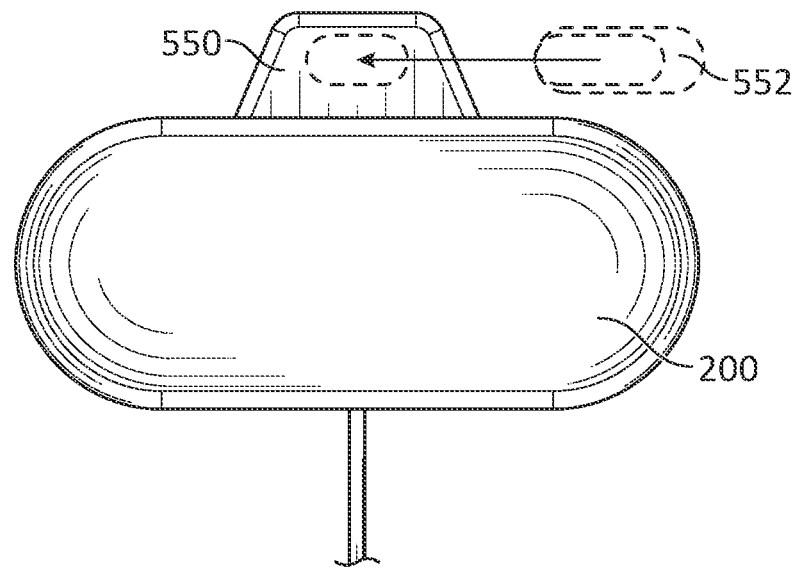

Referring to FIG. 5C, communication unit 200 may be mounted/unmounted by sliding the communication unit 200 relative to windshield mount 552. For instance, device mount 550 may be secured to windshield mount 552 by positioning device mount 550 laterally adjacent to the windshield mount 552 and sliding the device mount 550 into, on, or around windshield mount 552 (e.g., sliding communication unit 200 to the right in FIG. 5C). Sliding the communication unit 200 in the opposite direction (e.g., to the left in FIG. 5C) will unmount the communication unit 200 from windshield mount 552.

Figure 5D:
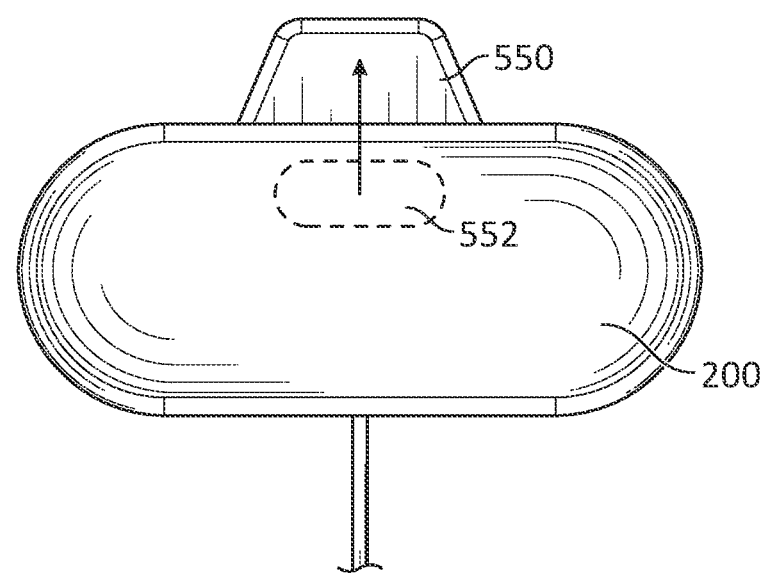

Referring to FIG. 5D, communication unit 200 may be mounted to windshield mount 552 by sliding (or dropping) the device mount 550 down onto windshield mount 552. For example, device mount 550 may be secured to windshield mount 552 by positioning device mount 550 above the windshield mount 552 and sliding the device mount 550 down and into, on, or around windshield mount 552. Pulling the communication unit 200 upward will then unmount the communication unit 200 from windshield mount 552.

Figure 5E:
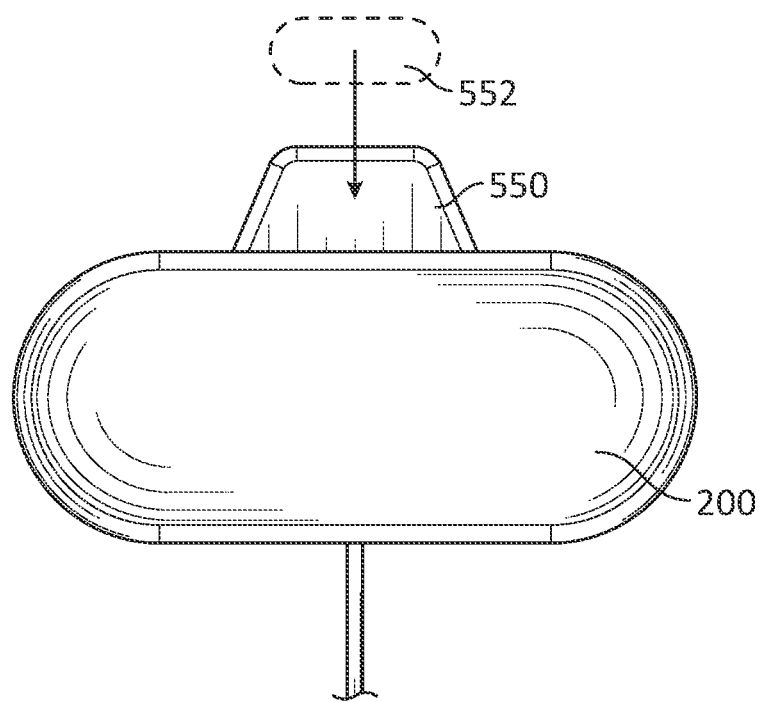

Referring to FIG. 5E, communication unit 200 may be simply secured to a magnet embodied as windshield mount 552. For example, device mount 550 may be magnetically secured to windshield mount 552. Pulling communication unit 200 outward may unmount the communication unit 200 from windshield mount 552. Such embodiments are illustrative only, and the communication unit 200 may be secured to the front windshield 210 in other configurations.

Figure 6:
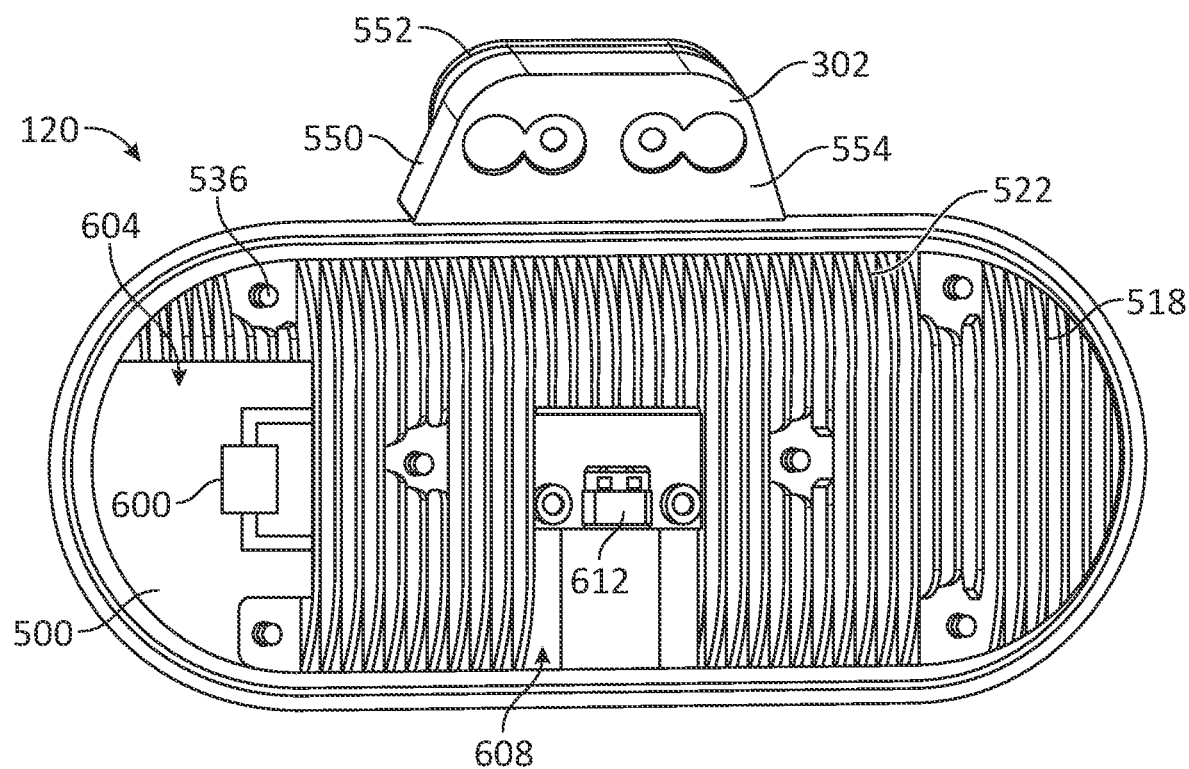
FIG. 6 illustrates a rear view of the communication unit with a rear portion of the communication unit removed for illustration purposes, in accordance with an embodiment of the disclosure.

FIG. 6 illustrates a rear view of the communication unit 200 with a portion of the rear enclosure 306 removed for illustration purposes, in accordance with an embodiment of the disclosure. As shown, the communication unit 200 may include a communications module 600 connected to the PCBA 500. The communications module 600 may include Bluetooth or other wireless communications devices. The communications module 600 may allow the communication unit 200 to be paired to a device, such as to the vehicle 202 or to a mobile device (e.g., smartphone) of the driver of the vehicle 202. In such embodiments, a first relief 604 may be disposed in the heat sink 518 to facilitate wireless communications to or from the communications module 600. Without the first relief 604, the heat sink 518 may shield the communications module 600, limiting or preventing wireless communications. As shown, the first relief 604 may be disposed on the perimeter of the heat sink 518, although other configurations are contemplated depending on the location of the communications module 600. In embodiments, a second relief 608 may be disposed in the heat sink 518 to facilitate connection of the PCBA 500 with the power cable 318. For example, the PCBA 500 may include a power connector 612 extending through the second relief 608 for connection with the power cable 318.

Figure 7:
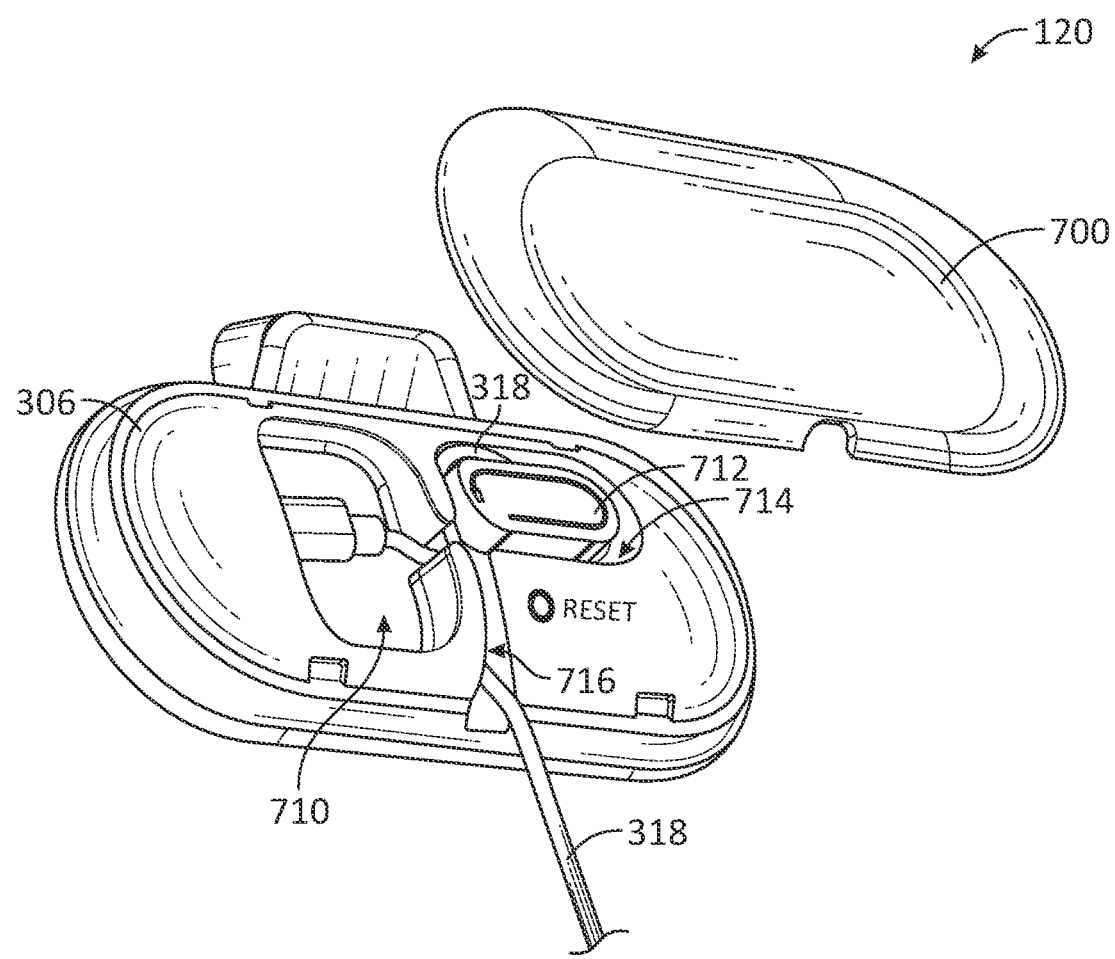
FIG. 7 illustrates a rear view of the communication unit with a rear cover removed to illustrate a cable retention structure of the communication unit, in accordance with an embodiment of the disclosure.

FIG. 7 illustrates a rear view of the communication unit 200 with a rear cover removed to illustrate a cable retention structure of the communication unit 200, in accordance with an embodiment of the disclosure. Referring to FIG. 7, the communication unit 200 may include a removable rear cover 700 connected to the rear enclosure 306. The rear cover 700 may be removed to connect the power cable 318 to the communication unit 200, to access reset or other functions of the communication unit 200, or the like. As shown, the communication unit 200 may include a structure 702 interfacing with the power cable 318 and configured to transfer a force applied to the power cable 318 to the rear enclosure 306. For example, the structure 702 may retain, hold or otherwise secure the power cable 318 such that pulling the power cable 318 does not unplug the power cable 318 from the communication unit 200. The structure 702 may be embodied as a cord lock, such as a friction cord lock, that limits movement of the power cable 318 away from the rear enclosure 306. In these and other embodiments, the power cable 318 may interface with the housing 300 to transfer loads to the housing 300 and not to the connection of the power cable 318 with the communication unit 200.

For example, as shown, the rear enclosure 306 may include a plug recess 710, a post 712, a first cable channel 714 disposed around the post 712, and a second cable channel 716 disposed from the first cable channel 714 to the bottom of the rear enclosure 306. The plug recess 710 may be open to the first cable channel 714. The power cable 318 may be plugged into the communication unit 200 within the plug recess 710. The power cable 318 may extend from the plug recess 710 into the first cable channel 714 to wrap around the post 712. Once wrapped around the post 712, the power cable 318 may then extend from the first cable channel 714 into the second cable channel 716 to ultimately exit the second cable channel 716 at the bottom of the rear enclosure 306. When a force is applied to the power cable 318, such as from pulling the power cable 318 away from the communication unit 200, the power cable 318 may be tightened against the post 712 and limited or prevented from sliding along the post 712 due to friction. As a result, the pulling force applied to the power cable 318 may be transferred to the post 712 of the rear enclosure 306, limiting or preventing the power cable 318 from being unplugged from the communication unit 200.

Figure 8:
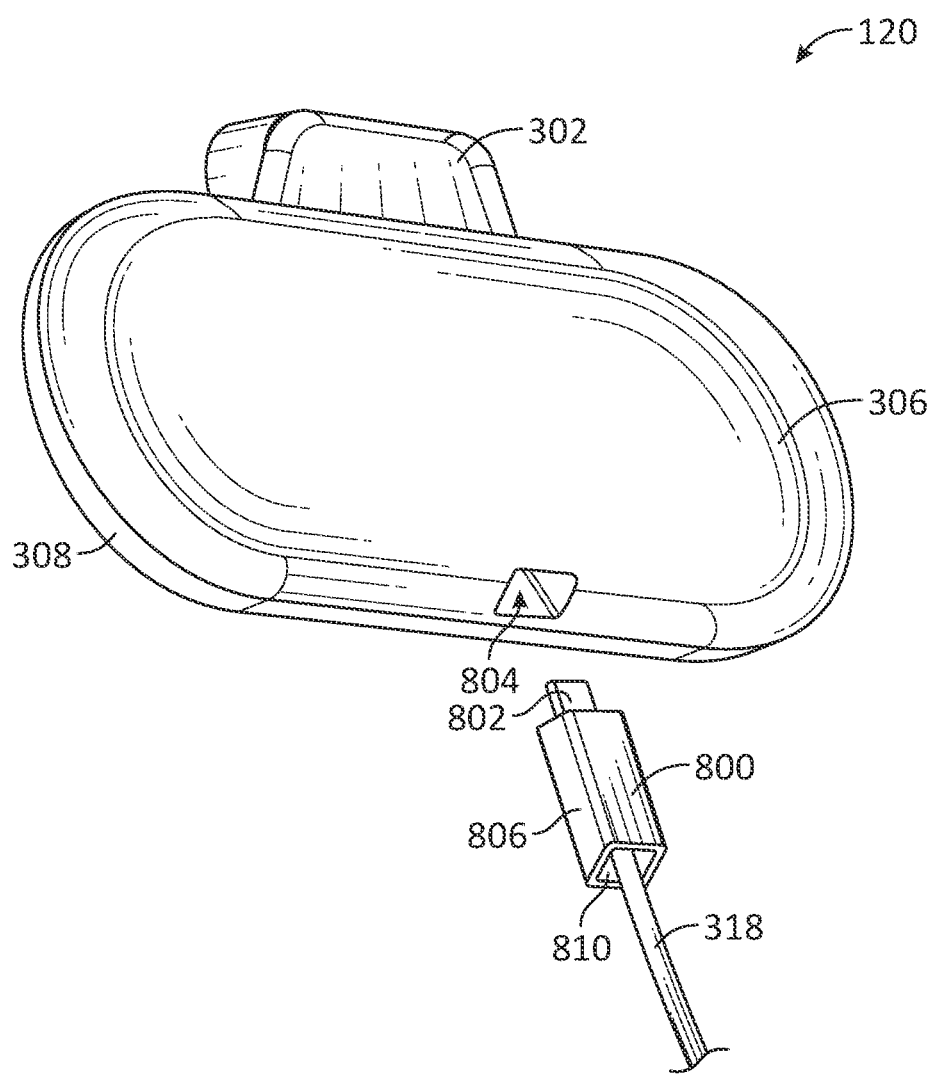
FIG. 8 illustrates a rear view of the communication unit with a power cable unplugged from the communication unit, in accordance with an embodiment of the disclosure.
Figure 9:
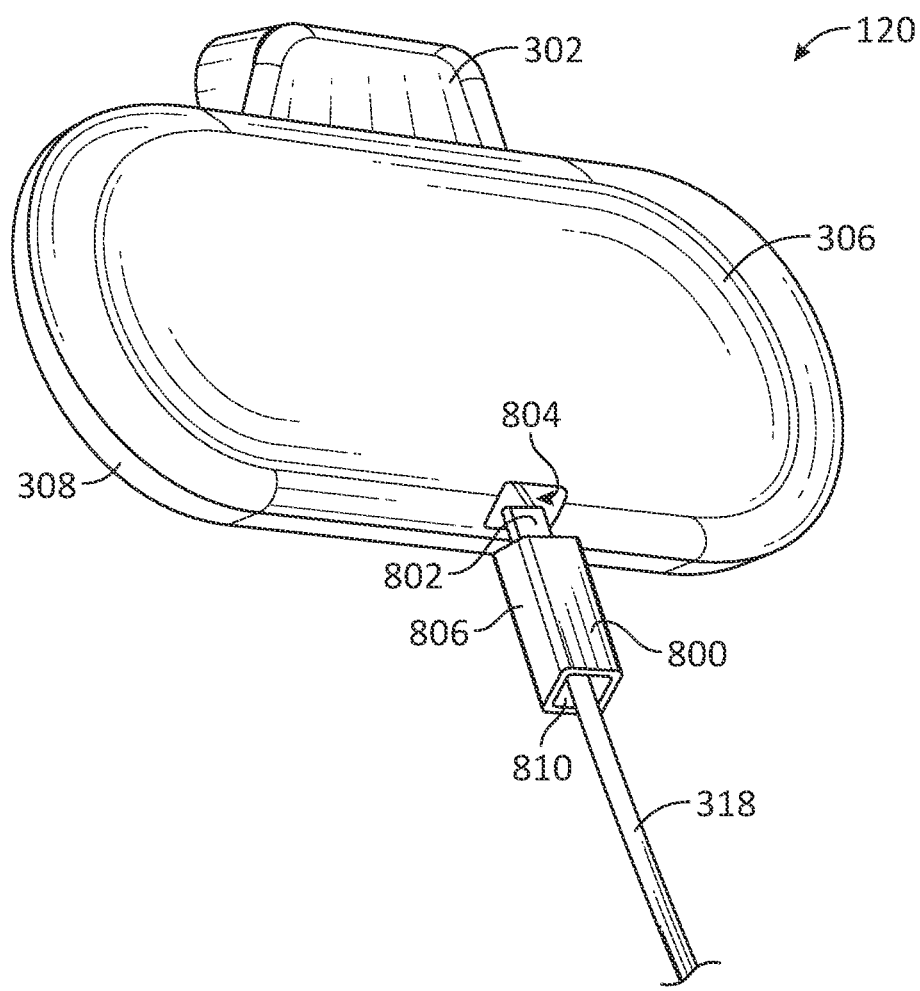
FIG. 9 illustrates a rear view of the communication unit with the power cable partially inserted into the communication unit, in accordance with an embodiment of the disclosure.
Figure 10:
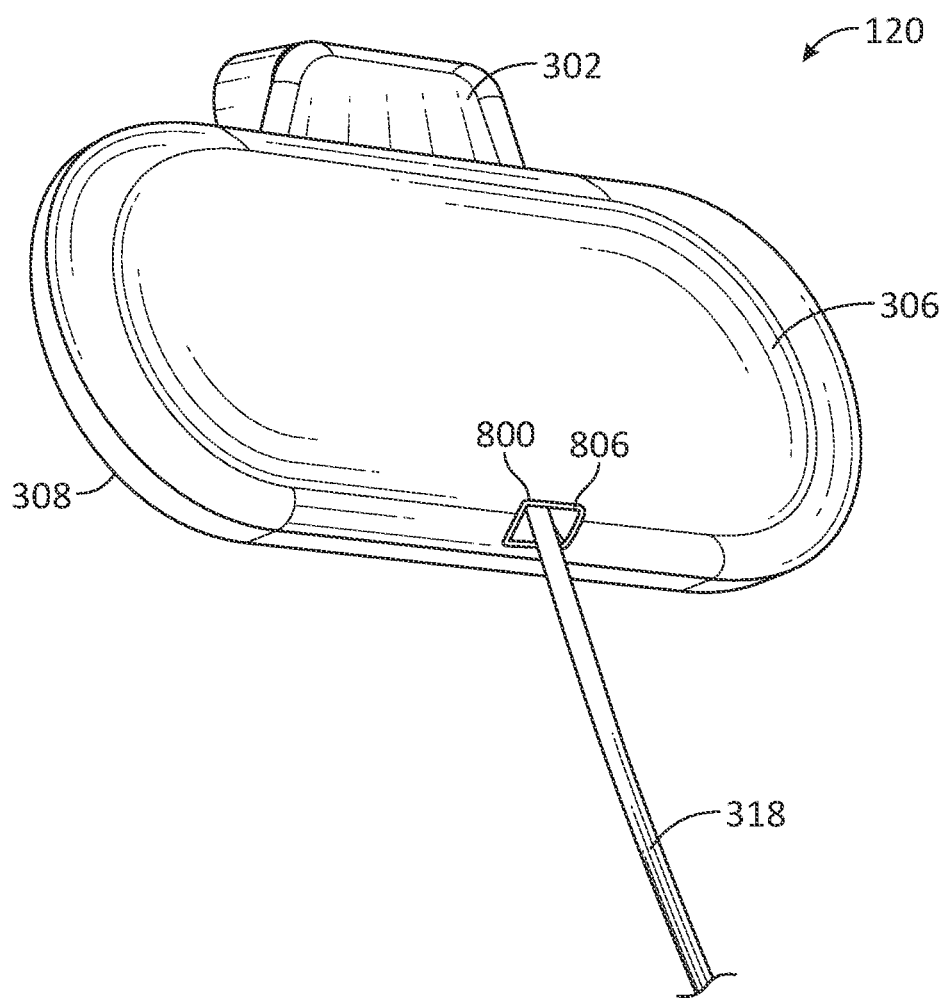
FIG. 10 illustrates a rear view of the communication unit with the power cable plugged in, in accordance with an embodiment of the disclosure.

FIGS. 8-10 illustrate various views of a connection of the power cable 318 with the communication unit 200, in accordance with one or more embodiments of the disclosure. FIG. 8 illustrates a rear view of the communication unit 200 with the power cable 318 unplugged from the communication unit 200. FIG. 9 illustrates a rear view of the communication unit 200 with the power cable 318 partially inserted into the communication unit 200. FIG. 10 illustrates a rear view of the communication unit 200 with the power cable 318 plugged in. Referring to FIGS. 8-10, the power cable 318 may include a terminal end 800 with a plug 802 (e.g., a micro-USB interface). The terminal end 800 may be shaped to fit within a recess 804 disposed in the rear enclosure 306. Depending on the application, the terminal end 800 may be shaped to fill the recess 804 when the power cable 318 is plugged into the communication unit 200.

In some embodiments, the power cable 318 may include an integrated cable overmold 806 sized and shaped to fill the recess 804 disposed in the rear enclosure 306. For example, as shown in FIG. 10, a transition between the cable overmold 806 and the rear enclosure 306 may be seamless or generally seamless when the power cable 318 is plugged into the communication unit 200. In embodiments, a portion of the cable overmold 806 may be exposed outside of the rear enclosure 306 when the power cable 318 is plugged in. In embodiments, the cable overmold 806 may define or include a strain relief 810 to limit or prevent damage to the power cable 318 due to bending. The strain relief 810 may be defined as a sloping surface disposed in the cable overmold 806. In embodiments, the power cable 318 may be flat to protect the internal wires from repeated bending/pulling in multiple directions, although other configurations are contemplated.

Figure 11:
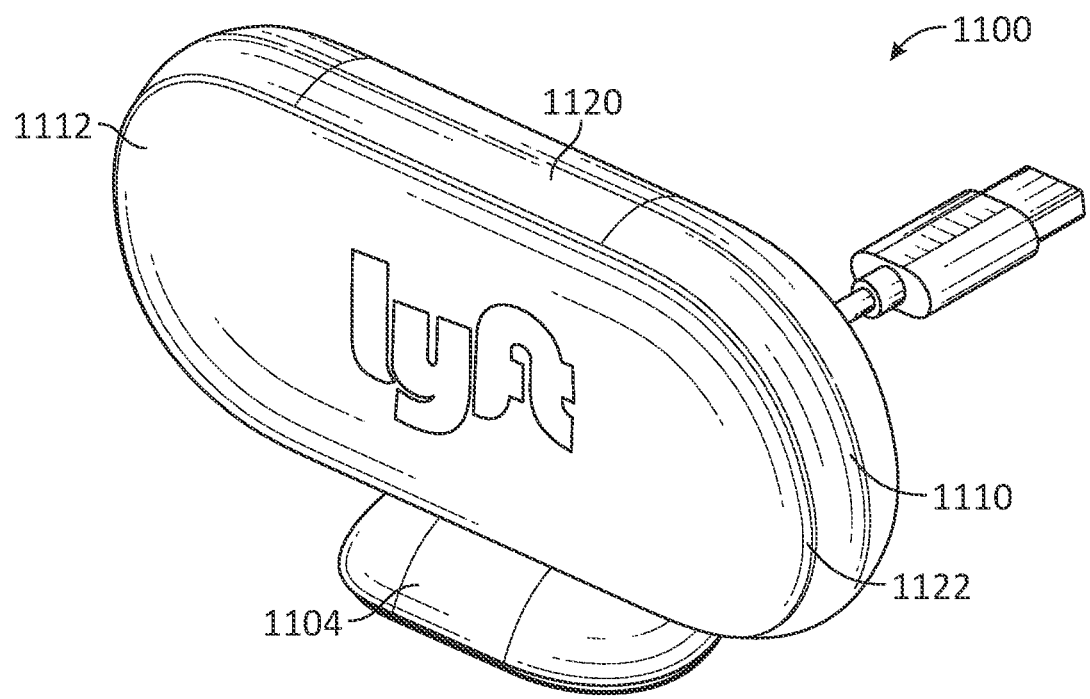
FIG. 11 illustrates a front perspective view of another communication unit configured to attach to a dashboard of a vehicle, in accordance with an embodiment of the disclosure.
Figure 12:
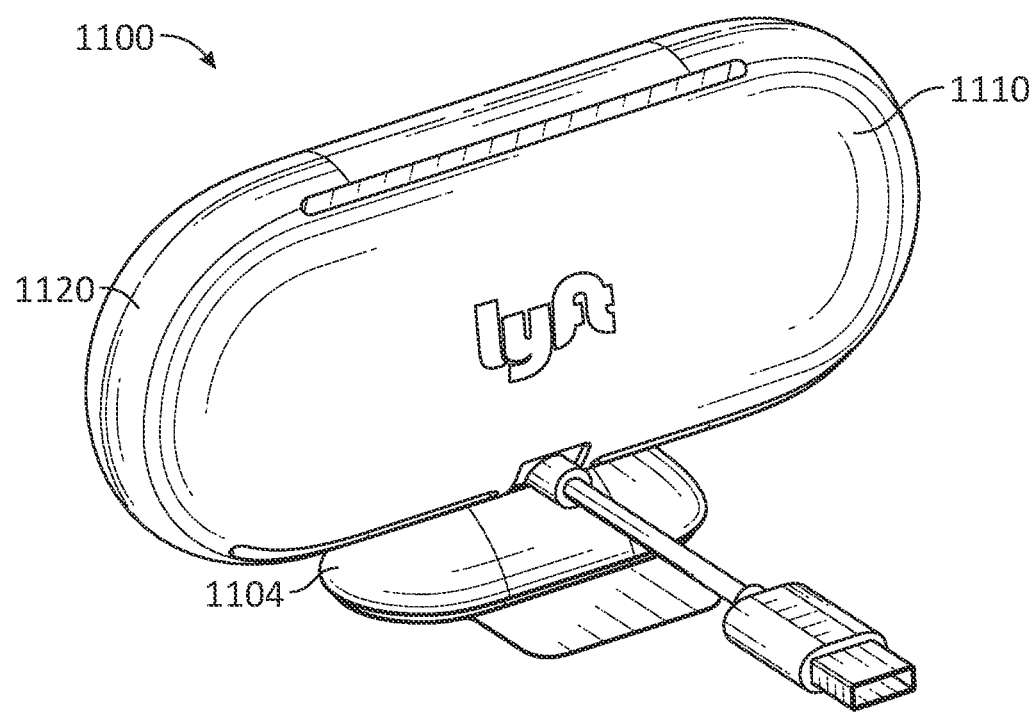
FIG. 12 illustrates a rear perspective view of the communication unit of FIG. 11, in accordance with an embodiment of the disclosure.

FIG. 11 illustrates a front perspective view of another communication unit 1100, in accordance with an embodiment of the disclosure. FIG. 12 illustrates a rear perspective view of the communication unit 1100, in accordance with an embodiment of the disclosure. FIG. 13 illustrates a front elevation view of the communication unit 1100, in accordance with an embodiment of the disclosure. FIG. 14 illustrates a side elevation view of the communication unit 1100, in accordance with an embodiment of the disclosure. Except as otherwise noted below, communication unit 1100 may be similar to communication unit 200. Thus, any description of communication 200 above may be applied to communication unit 1100.

Referring to FIGS. 11-14, communication unit 1100 may be configured for attachment to a dashboard of a vehicle (e.g., to dashboard of vehicle 202). For example, communication unit 1100 may include a stand 1104 allowing communication unit 1100 to be attached to dashboard, such as to limit blocking of front windshield or a driver's line-of-sight compared to windshield-mounted designs. The stand 1104 (e.g., which may be referred to as a mount or a dashboard mount) may be adhered to the dashboard (e.g., via pressure sensitive adhesive, etc.).

In some embodiments, the stand 1104 may be removable from communication 1100, such as to allow a driver to remove the communication 1100 from the windshield area and/or allow the driver to "badge in" or "badge out," as described above. In embodiments, the stand 1104 may include a magnet, and the communication unit 1100 may include corresponding magnets or a steel plate. For example, communication unit 1100 may include a magnetic stainless steel plate (e.g., attached to or formed in the housing of communication 1100) that attaches to the magnet of the stand 1104, although other configurations are contemplated. Depending on the application, the relative position between the stand 1104 and the communication unit 100 may be fixed, or the connection between the stand 1104 and the communication unit may allow adjustment of the communication unit 1100 relative to the stand 1104, such as in a manner described above.

As shown, communication unit 1100 includes an enclosure 1110 and a lens 1112 coupled to the enclosure 1110. The enclosure 1110, which may be similar to rear enclosure 306 described above, may include a frame 1120 configured to surround the lens 1112. The frame 1120 may be sized, shaped, and positioned to cover the interface between the enclosure 1110 and the lens 1112. For example, when the lens 1112 is connected to the enclosure 1110 (e.g., when enclosure 1110 and the lens 1112 snap together) to form the overall housing of communication unit 1100, the frame 1120 may surround the lens 1112 (e.g., when viewed from a front view). The above configurations may further limit light bleed at the interface between the lens 1112 and the enclosure 1110, such as to limit glare on the windshield. Depending on the application, the frame 1120 may be an 8 mm deep frame, although other configurations are contemplated.

Depending on the application, the frame 1120 may sit flush or substantially flush with the lens 1112 when the lens 1112 is connected to the enclosure 1110. As best illustrated in FIG. 14, a parting line 1122 between the enclosure 1110 (e.g., the frame 1120) and the lens 1112 may be defined towards the lens 1112, although other configurations are contemplated.

Mounting the communication unit 1100 to the dashboard may increase a thermal load on communication unit 1100 compared to windshield-mounted designs (e.g., positioned closer to a hot dashboard). However, the thermal architecture of communication unit 1100 (e.g., thermal architecture 502) may address the increase in temperature from mounting communication unit 1100 onto the dashboard. For example, thermal architecture 502 may be capable of dissipating heat generated during operation of communication unit 1100 under all conditions, such as in a manner as described above.

All relative and directional references (including upper, lower, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A communication unit for attachment to a vehicle, the communication unit comprising:
   an enclosure including walls that define a cavity, the walls carrying components within the cavity that include:
   a printed circuit board assembly (PCBA) comprising a plurality of light emitting elements;
   a position sensor configured to detect a position of the communication unit in an environment; and
   a thermal architecture configured to dissipate heat generated by the plurality of light emitting elements and the position sensor;
   a lens secured to the enclosure and comprising an emblem configured to be illuminated by the plurality of light emitting elements, wherein the plurality of light emitting elements comprises a plurality of light emitting diodes (LEDs) arranged along a perimeter of the PCBA and around the position sensor, and wherein the lens includes a curved lens surface that the emblem is disposed thereon; and
   a mount configured to attach the enclosure to the vehicle.

2. The communication unit of claim 1, wherein the plurality of light emitting elements comprises a plurality of colored light emitting diodes (LEDs) configured to emit a certain color or a certain pattern based on a ride for the vehicle or based on a selection by a requester of the ride.

3. The communication unit of claim 1, wherein:
   at least one of the PCBA, position sensor, or thermal architecture is carried at least partially in the cavity;
   the lens is configured to diffuse light emitted from the plurality of light emitting elements; and
   a gasket is positioned at an interface defined between the lens and the enclosure, wherein the gasket is configured to limit light bleed associated with the emitted diffuse light at the interface.

4. The communication unit of claim 1, wherein the mount includes a magnetic element that is configured to releasably secure the enclosure to a windshield or a dashboard of the vehicle.

5. The communication unit of claim 4, wherein the mount comprises a windshield mount attachable to the windshield of the vehicle and a device mount connected to the enclosure, wherein the device mount is magnetically coupled to the windshield mount to releasably secure the communication unit to the windshield of the vehicle.

6. The communication unit of claim 4, further comprising a sensor configured to detect a mounting condition of the enclosure to the vehicle.

7. The communication unit of claim 1, wherein the thermal architecture comprises:
   a heat sink; and
   one or more thermal interface pads positioned between the PCBA and the heat sink and providing a pathway for heat to dissipate from the PCBA to the heat sink.

8. The communication unit of claim 7, further comprising:
   a communications module connected to the PCBA; and
   a relief disposed in the heat sink to facilitate wireless communications to or from the communications module.

9. The communication unit of claim 1, wherein the position sensor comprises at least one of a global navigation satellite system (GNSS) sensor or an inertial measurement unit (IMU).

10. The communication unit of claim 1, further comprising one or more ambient sensors, wherein a lumen output of the plurality of light emitting elements is adjusted based on a condition associated with the environment detected by the one or more ambient sensors.

11. A communication unit for use with a vehicle, the communication unit comprising:
    an enclosure defining a cavity, the enclosure carrying components within the cavity that include:
    a printed circuit board assembly (PCBA) comprising:
    a position sensor in communication with the vehicle and configured to detect a position of the vehicle; and
    a plurality of light emitting elements disposed adjacent to the position sensor and configured to generate a light output, wherein the plurality of light emitting elements comprises a plurality of light emitting diodes (LEDs) arranged around the position sensor to facilitate in wide dispersal of the light output;
    a heat sink coupled to the PCBA and configured to dissipate heat caused by the plurality of light emitting elements generating the light output; and
    a diffuser lens that includes a diffuser lens surface having an emblem disposed thereon, the diffuser lens being configured to receive the light output generated by the plurality of light emitting elements and diffusely illuminate the emblem, wherein the diffuser lens surface is configured to widely disperse the light output.

12. The communication unit of claim 11, further comprising:
    a mount configured to releasably secure the enclosure to the vehicle; and
    a sensor configured to detect a mounting condition of the enclosure to the vehicle.

13. The communication unit of claim 11, wherein the diffuser lens surface is curved and the curved diffuser lens surface is configured to cause the light output to be uniformly distributed at the diffuser lens.

14. The communication unit of claim 11, further comprising:
    a power cable; and a structure interfacing with the power cable and configured to transfer a force applied to the power cable to the enclosure.

15. The communication unit of claim 11, further comprising one or more ambient sensors, wherein a lumen output of the plurality of light emitting elements is adjusted based on a condition associated with the environment detected by the one or more ambient sensors.

16. A communication unit for a vehicle, the communication unit comprising:
 a housing comprising an enclosure and a lens coupled to the enclosure, wherein the housing carries:
  a printed circuit board assembly (PCBA) comprising:
   a position sensor configured to detect a position of the communication unit; and
   a plurality of light emitting diodes (LEDs) arranged around the position sensor and configured to generate light output for illuminating an emblem of the lens;
  an environmental sensor configured to detect an environmental condition external to the housing, wherein the light output generated by the plurality of LEDs is adjustable based on the environmental condition detected by the environmental sensor; and
  a heat sink configured to dissipate heat generated by the PCBA.

17. The communication unit of claim 16, further comprising:
 a windshield mount configured to releasably secure the enclosure to a windshield of the vehicle; or
 a dashboard mount configured to releasably secure the rear enclosure to a dashboard of the vehicle.

18. The communication unit of claim 16, further comprising:
 a fastener securing the PCBA and the heat sink to the enclosure; and
 a thermal interface pad positioned between the PCBA and the heat sink and providing a pathway for heat to dissipate from the PCBA to the heat sink.

* * * * *